United States Patent
Sugaki et al.

(10) Patent No.: US 10,427,781 B2
(45) Date of Patent: Oct. 1, 2019

(54) UNMANNED AERIAL VEHICLE

(71) Applicant: PRODRONE CO., LTD., Nagoya-shi, Aichi (JP)

(72) Inventors: Kiyokazu Sugaki, Nagoya (JP); Masakazu Kono, Nagoya (JP); Kazuo Ichihara, Nagoya (JP)

(73) Assignee: PRODRONE CO., LTD., Nagoya (JP)

(*) Notice: Subject to any disclaimer, the term of this patent is extended or adjusted under 35 U.S.C. 154(b) by 238 days.

(21) Appl. No.: 15/566,660

(22) PCT Filed: Apr. 19, 2016

(86) PCT No.: PCT/JP2016/062348
§ 371 (c)(1),
(2) Date: Oct. 13, 2017

(87) PCT Pub. No.: WO2016/171120
PCT Pub. Date: Oct. 27, 2016

(65) Prior Publication Data
US 2018/0134379 A1    May 17, 2018

(30) Foreign Application Priority Data
Apr. 19, 2015  (JP) .................. 2015-085506

(51) Int. Cl.
*B64C 27/08* (2006.01)
*B64D 25/00* (2006.01)
(Continued)

(52) U.S. Cl.
CPC ............ *B64C 27/08* (2013.01); *B64C 39/024* (2013.01); *B64D 25/00* (2013.01); *B64D 27/24* (2013.01)

(58) Field of Classification Search
CPC ... B64C 27/08; B64C 27/24; B64C 2201/024; B64C 2201/108; B64D 25/00
See application file for complete search history.

(56) References Cited

U.S. PATENT DOCUMENTS

2010/0147993 A1   6/2010  Annati et al.
2010/0301168 A1  12/2010  Raposo
(Continued)

FOREIGN PATENT DOCUMENTS

CN     103625640 A    3/2014
JP     H04-274995 A   9/1992
(Continued)

OTHER PUBLICATIONS

Jul. 26, 2016 International Search Report issued in International Patent Application No. PCT/JP2016/062348.

*Primary Examiner* — Philip J Bonzell
*Assistant Examiner* — Tye William Abell
(74) *Attorney, Agent, or Firm* — Oliff PLC

(57) ABSTRACT

A multicopter equipped with a fall prevention device enabling it to prevent the airframe from falling even in case the multicopter has become unable to fly normally for various reasons. A multicopter includes a multicopter main body having rotors which are driven by a power source, a plurality of emergency rotors which are driven by an emergency power source which is different from the power source, abnormality detection sensors for detecting abnormality of the multicopter main body, and an emergency control device, the multicopter being configured such that, when the abnormality detection sensors have detected abnormality of the multicopter main body, the emergency control device performs control to deactivate operation of the rotors and drive the emergency rotors by the emergency power source to prevent a rapid fall of the multicopter.

8 Claims, 4 Drawing Sheets

(51) Int. Cl.
 *B64C 39/02* (2006.01)
 *B64D 27/24* (2006.01)

(56) References Cited

U.S. PATENT DOCUMENTS

2015/0012154 A1 1/2015 Senkel et al.
2018/0029703 A1* 2/2018 Simon ................ B64C 29/0025

FOREIGN PATENT DOCUMENTS

| JP | H05-193579 A | 8/1993 |
| JP | 2010-137844 A | 6/2010 |
| JP | 2015-137092 A | 7/2015 |
| JP | 2016-88111 A | 5/2016 |

* cited by examiner

UNMANNED AERIAL VEHICLE

TECHNICAL FIELD

The present invention relates to an unmanned aerial vehicle equipped with a safety device.

BACKGROUND ART

A multicopter is one type of a helicopter and a machine having, generally, three or more rotors and flying by rotating these rotors at the same time, while keeping balance.

Unlike a helicopter having two or fewer main rotors, a multicopter does not need to have a complex mechanism of its rotors themselves and, therefore, the multicopter is very easy to maintain and its airframe can be built at more inexpensive cost.

Since an acceleration sensor, an angular velocity sensor, etc. which have high performance and are easy to handle have recently become widespread at a reasonable price, by combining a control mechanism with these sensors, stable operation and very easy maneuverability are being realized, especially in a comparatively small airframe such as a model aircraft and a unmanned aircraft.

Because of such a feature, multicopters are being utilized for diverse operations, not only for hobby, such as model aircrafts. Now, multicopters equipped with three, four, six, or eight rotors are becoming popular and a multicopter airframe specialized for a purpose is becoming available, such as one moving at high speed and one capable of carrying heavy objects.

CITATION LIST

Patent Literature

PTL1: JP 2010-137844 A
PTL2: JP H05-193579 A

SUMMARY OF INVENTION

Technical Problem

In multicopters, the following may become a critical cause resulting in a fall: abnormality of a control device to control attitude and a suite of sensors, abnormality of a motor which rotates rotors, abnormality of a power source such as a battery, loosened or damaged wire connections, damaged rotors, and parts that are missing or unsteady, because tightening of each part becomes loose.

Especially, a motor having a moving part which operates heavily has a shorter product lifetime as compared with other components and is prone to fail. When failure or abnormality occurs in a motor, it is hard for a multicopter with four or fewer rotors to maintain its attitude and the multicopter manipulated by even a skillful operator cannot avoid falling.

For instance, at the Flying Machine Arena in Switzerland, a team of professors of the Swiss Federal Institute of Technology Zurich is studying a control method for avoiding an airframe from falling even in a case where one of four rotors has failed. However, since this method entails a large attitude change, realizing it for a large airframe is difficult.

Even a multicopter equipped with five or more rotors cannot avoid falling in the event of failure of a control device to control attitude and a suite of sensors or a battery as a power source.

Therefore, the present invention is intended to provide an unmanned aerial vehicle capable of preventing a rapid fall of its airframe even in case the vehicle has become unable to fly normally for any reason.

Solution to Problem

To solve the foregoing problem, an unmanned aerial vehicle of the invention of the present application is equipped with a plurality of rotors and includes a power source for the plurality of rotors, emergency rotors which can be driven by an emergency power source which is different from the power source, an abnormality detection sensor for detecting abnormality of the unmanned aerial vehicle main body, and an emergency control device, wherein when the abnormality detection sensor has detected abnormality of the unmanned aerial vehicle main body, the emergency control device deactivates operation of the plurality of rotors and drives the emergency rotors by the emergency power source.

In addition, it is preferable that the unmanned aerial vehicle of the present invention includes an altitude sensor which is able to measure altitude of the unmanned aerial vehicle main body and is actuated by the emergency power source and the emergency control device adjusts the rotating speed of the emergency rotors to make the unmanned aerial vehicle main body descend at an optimum falling speed appropriate to an altitude measured by the altitude sensor.

In addition, it is preferable that the unmanned aerial vehicle of the present invention includes a distance measurement sensor which is able to measure a distance from the unmanned aerial vehicle main body to the ground surface and is actuated by the emergency power source, and when the distance measurement sensor has detected that the unmanned aerial vehicle main body has come close to the ground surface at a predetermined distance to the ground surface, the emergency control device adjusts the rotating speed of the emergency rotors to cushion landing shock of the unmanned aerial vehicle main body.

In addition, in the unmanned aerial vehicle of the present invention, it is preferable that an emergency module in which the emergency power source and the emergency rotors are integrated is fixed to the unmanned aerial vehicle main body so as to be separable from the main body, and the vehicle includes suspension means for placing the unmanned aerial vehicle main body in a state that the main body is suspended from the emergency module after separation of the emergency module.

In addition, in the unmanned aerial vehicle of the present invention, it is preferable that the emergency module is fixed to a top side of the unmanned aerial vehicle main body, and the suspension means is connected to a point vertically beneath the gravity center of the emergency module.

In addition, in the unmanned aerial vehicle of the present invention, it is preferable that separation of the emergency module from the unmanned aerial vehicle main body breaks power lines or signal lines of the unmanned aerial vehicle main body and deactivates operation of the plurality of rotors of the unmanned aerial vehicle main body.

In addition, it is preferable that the unmanned aerial vehicle of the present invention is formed such that, upon separation of the emergency module and the multicopter main body, power lines or signal lines of the unmanned aerial vehicle main body are broken to deactivate operation of the rotors of the multicopter main body.

In addition, it is possible for the unmanned aerial vehicle of the present invention that the emergency rotors are driven by the power source during an ordinary flight and, upon detection of abnormality of the multicopter, switching from the power source to the emergency power source is performed to drive the emergency rotors.

Advantageous Effects of Invention

The present invention includes a plurality of emergency rotors which are driven by an emergency power source which is different from the power source of the unmanned aerial vehicle main body, abnormality detection sensors for detecting abnormality of the unmanned aerial vehicle main body, and an emergency control device. When the abnormality detection sensors have detected abnormality of the unmanned aerial vehicle main body, the emergency control device performs control to deactivate operation of the rotors and drive the emergency rotors by the emergency power source. Therefore, according to the present invention, it is possible to avoid a rapid fall of the airframe even in case the unmanned aerial vehicle main body becomes uncontrollable during a flight for any reason and has become unable to fly normally.

DESCRIPTION OF EMBODIMENTS

An embodiment of the present invention will be described with reference to the attached drawings. An embodiment which will be described below is one example of embodiment of the present invention, and the present invention is not limited to the following embodiment. Now, in the present specification and the drawings, components whose reference designator is identical denote those identical to each other.

Figure 1:
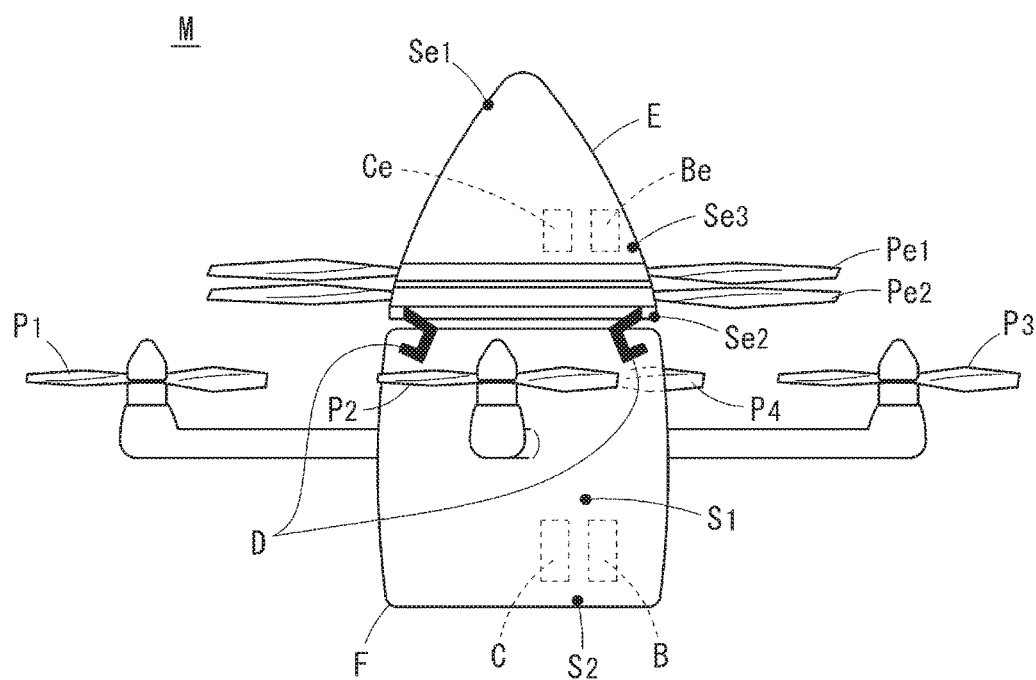
FIG. 1 is a front view depicting one example of a multicopter of the present invention.

FIG. 1 depicts one embodiment of a multicopter M which is an unmanned aerial vehicle of the present invention. The multicopter M pertaining to the present embodiment, as depicted in FIG. 1, is comprised of four rotors P1 to P4 which are driven by a power source B such as a battery, a multicopter main body F (hereinafter may be shortened to a main body F) including, inter alia, an airframe control device C which manages the attitude and operation of the multicopter M when flying, two emergency rotors Pe1, Pe2 which are driven by an emergency power source Be which includes a standby battery or the like which is not used during ordinary operation, different from the power source B, abnormality detection sensors S2, Se1 for detecting abnormality of the main body F, and an emergency control device Ce which is used for control in an emergency not under direct management of the control device of the main body F.

An abnormality detection sensor S2 is supplied with power from the power source B and an abnormality detection sensor Se1 is supplied with power from the emergency power source Be. Such redundant provision of abnormality detection sensors enhances the reliability of detecting abnormality of the main body F.

The multicopter M in FIG. 1 has modular equipment for emergency use and an emergency module E which is formed as a separate body from the main body F is coupled to the top side of the main body F. The emergency module E is fixed to the main body F so as to be separable from the main body. The multicopter M includes suspension means (which will be described later) including a rope, wire, or the like to place the main body F in a state that it is suspended from the emergency module E after separation of the emergency module E.

A separating device D is provided between the emergency module E and the main body F. The separating device D is configured to be able to physically separate the emergency module E from main body F immediately in case of emergency.

In the emergency module E, there are provided the emergency power source Be, the emergency control device Ce, the abnormality detection sensor Se1, a distance measurement sensor Se2 which measures a distance to the ground surface, an attitude sensor Se3 which measures an attitude tilt, the emergency rotors Pe1, Pe2, etc.

In the main body F, there are provided a plurality of rotors P1 to P4 which are connected by a support housing, the power source B which gives power to each piece of equipment in the main body F, an attitude measurement sensor S1 for measuring an airframe attitude, the abnormality detection sensor S2 for detecting abnormality of the airframe, the airframe control device C which controls the airframe attitude and motion by adjusting the rotating speed of the rotors P1 to P4 and receives abnormality of the airframe from the abnormality detection sensor S2, etc.

The emergency control device Ce is provided with a function as a fall prevention device for emergency use which receives an abnormality detection signal from the abnormality detection sensor S2 or the abnormality detection sensor Se1 and controls the emergency rotors Pe1 and Pe2 to control descending speed in an emergency. The emergency rotors Pe1 and Pe2 are formed to rotate inversely to each other in order to prevent the airframe itself from turning. Also, the plurality of emergency rotors Pe1, Pe2 are designed to be able to support the weight of the whole airframe by lift produced by them.

When it has become hard for the multicopter M to control the airframe attitude or continue to fly because of failure or abnormality of the main body F, one of the abnormality detection sensors S2, Se1 detects the abnormality of the main body F and signals it to the emergency control device Ce eventually and, accordingly, the emergency control device Ce deactivates the operation of the rotors P1 to P4 to stop their rotation. Moreover, the emergency control device Ce performs control to drive the emergency rotors Pe1, Pe2 by the emergency power source Be in order to prevent a rapid fall of the multicopter M. By rotating the emergency rotors Pe1, Pe2 to produce lift, the multicopter main body F can be prevented from falling rapidly.

Abnormality of the main body F to be detected by the abnormality detection sensors S2, Se1 includes the following: abnormality of a control device to control attitude and a suite of sensors, abnormality of a motor which rotates rotors, abnormality of a power source such as a battery, abnormality of wire connections, a damaged rotor, and occurrence of an abnormal flying condition such as abnormal vibration of the airframe, an abnormal attitude, and a rapid fall due to missing parts or the like.

The abnormality detection sensors S2, Se1 are provided with a contrivance for detecting the attitude and vibration of the airframe and acceleration of its movement, and from these values, the sensors can detect a continuing abnormal attitude of the airframe, continuing abnormal vibration of the airframe, a rapid fall, close to free fall, of the airframe, continuing abnormal speed of the airframe, etc. When the sensors have detected that these values fall out of a predefined range or have exceeded a prescribed period of duration time, they can determine that abnormality has occurred in the main body F.

Hence, the abnormality detection sensors may be those having a function of detecting the abnormalities mentioned above. Specifically, the abnormality detection sensor S2 of the main body F and the abnormality detection sensor Se1 of the emergency module E can be comprised of, e.g., a consumption current ammeter with which the rotors P1 to P4 are equipped, a voltmeter capable of measuring a voltage of the power source B, a fuel level meter capable of measuring a remaining amount of fuel of the power source B, etc.

The airframe control device C of the main body F is provided with a contrivance for detecting abnormality of the motor from correlation between setup rotating speed and consumption current, a contrivance for detecting power source depletion and performance degradation from a voltage value and a fuel level meter by comparison against a predefined reference value, a contrivance for detecting a continuing fault in communication with the respective sensors connected to it, and so on, and is configured to be able to detect abnormality of the airframe and signal it to the emergency control device Ce.

The emergency rotors Pe1, Pe2, the emergency control device Ce, the abnormality detection sensor Se1, the distance measurement sensor Se2, an attitude sensor Se3, the separating device D, etc. are connected to receive power supplied from the emergency power source Be.

The rotors P1 to P4, the airframe control device C, the attitude measurement sensor S1, the abnormality detection sensor S2, etc. are connected to receive power supplied from the power source B during ordinary operation.

The emergency control device Ce is connected with the airframe control device C of the main body F via a communication network (not depicted). Moreover, the abnormality detection sensor S2 of the main body F is connected with the airframe control device C via the communication network, and the abnormality detection sensor Se1 of the emergency module E is connected with the emergency control device Ce via the communication network (not depicted). These sensors provide information to the emergency control device Ce.

When the emergency control device Ce receives a signal indicating abnormality of the airframe from the abnormality detection sensor Se1, it transmits a signal giving a command to deactivate function to the airframe control device C connected with it via the communication network.

The emergency control device Ce can adjust the descending speed of the multicopter when making an emergency landing and adjust it to a suitable falling speed by controlling the rotating speed of the emergency rotors Pe1 and Pe2 based on information representing a distance to the ground surface from the distance measurement sensor Se2. In addition, information representing a distance to the ground surface may be obtained using an altitude sensor or the like instead of the above distance measurement sensor Se2.

When the multicopter M has come close to the ground surface during an emergency landing and reached a predefined height above the ground, detected by the sensor capable of measuring a distance to the ground surface, it is preferable that the emergency control device Ce controls the rotation of the emergency rotors to increase the rotating speed of the emergency rotors Pe1 and Pe2 and decrease the descending speed. Thus, it is possible to cushion landing shock of the multicopter main body F.

When the attitude sensor Se3 has tilted beyond a predefined angle, the emergency control device Ce determines that the main body has reached the ground surface and slowly stops the rotation of the emergency rotors Pe1, Pe2. This can reduce damage to the emergency module E.

Furthermore, after the emergency module E has landed completely, the emergency control device Ce immediately stops the rotation of the emergency rotors Pe1, Pe2 and, thereby, it can be prevented that the emergency rotors Pe1, Pe2 damage a circumjacent object.

Figure 2:
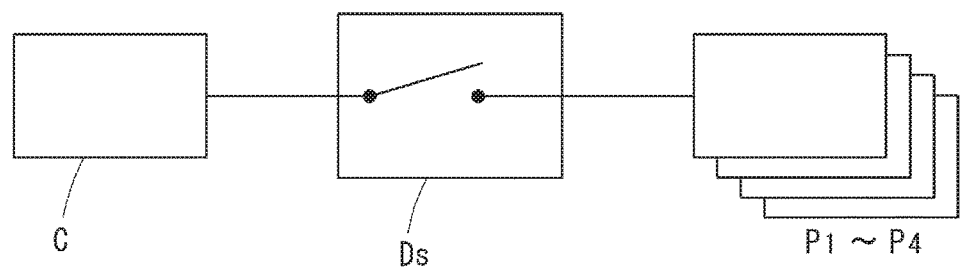
FIG. 2 is an explanatory diagram depicting a contrivance for breaking a communication network between the airframe control device of the main body of the multicopter in FIG. 1 and respective pieces of equipment.
Figure 3:
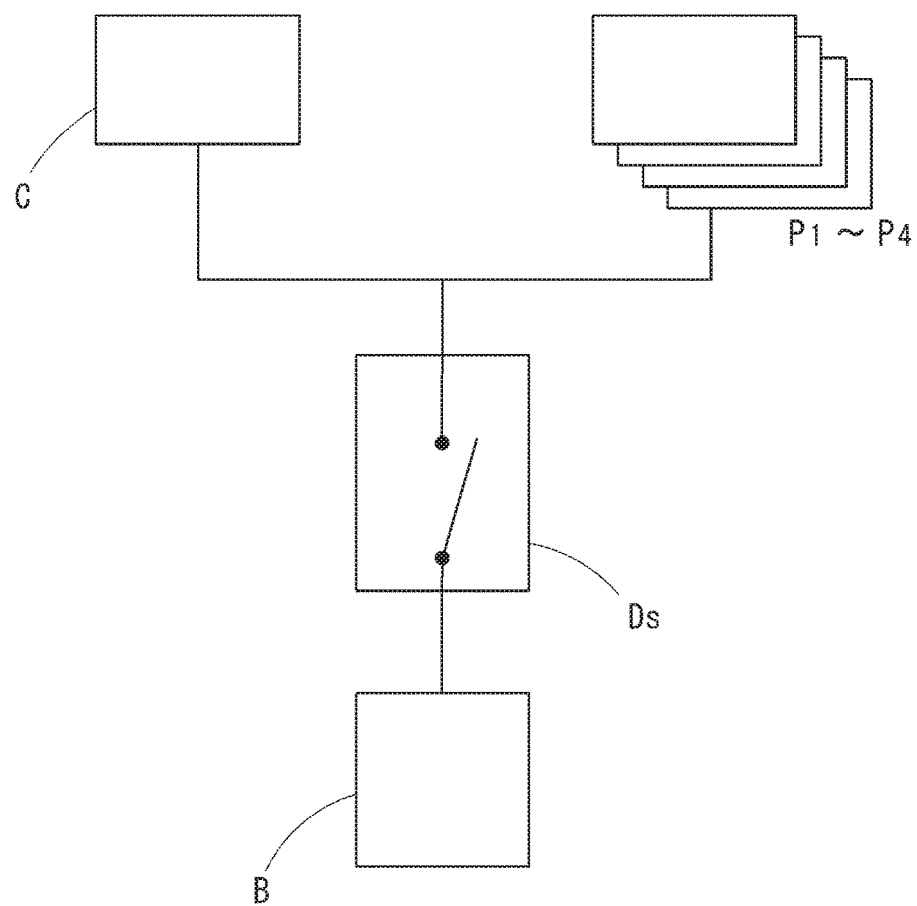
FIG. 3 is an explanatory diagram depicting a contrivance for breaking power lines between the power source of the main body of the multicopter in FIG. 1 and the respective pieces of equipment.

FIG. 2 and FIG. 3 are diagrams depicting a state that a forced shutdown device is provided. In the main body F, a forced shutdown device Ds which deactivates the operation of the main body F forcedly can be provided. The forced shutdown device Ds is connected to receive power supplied from the emergency power source Be. For example, as depicted in FIG. 2, the forced shutdown device Ds can be configured as a contrivance for breaking the communication network between the airframe control device C and the respective pieces of equipment such as the rotors P1 to P4 inside the main body F. In addition, as depicted in FIG. 3, the forced shutdown device Ds can also be configured as a contrivance for breaking power lines between the power source B and the respective pieces of equipment such as the rotors P1 to P4 inside the main body F.

Provision of the forced shutdown device Ds enables deactivating the function of the multicopter main body F forcedly after waiting for a predefined period of time. In a case where there is no communication network between the airframe control device C and the respective pieces of equipment or even when there is no response to the command to deactivate function mentioned previously, deactivating the function of the main body F can be carried out surely, if there is the forced shutdown device Ds.

Concurrently with carrying out function deactivation or forced function deactivation mentioned above, the emergency control device Ce performs control to rotate the emergency rotors Pe1 and Pe2 at a predefined rotating speed.

In addition, in a case where the emergency control device Ce is connected with the airframe control device C of the main body F via the communication network, by receiving abnormality signaling from the airframe control device C, it can detect abnormality of the airframe and determine that an emergent situation has occurred.

When the emergency control device Ce determines an emergent situation occurring, it transmits an actuation signal to the separating device D and performs control to physically separate the emergency module E from the main body F.

A structure of connecting the main body F with the emergency module E is non-limiting and diverse means can be applied for it. The separating device D is only required to have a structure allowing for separation of the main body F and the emergency module E which are fixed together as an integral structure under normal conditions by releasing the fixture in case of emergency.

Concrete examples of the separating device D include, inter alia, a method of releasing the lock of a fixing tool which fixes the main body F and the emergency module E together by an electromagnetic contrivance and means for breaking the connecting structure by utilizing an explosion by gunpowder in a small quantity or the like, like an airbag for use to ensure safety in case of car crash.

Figure 4:
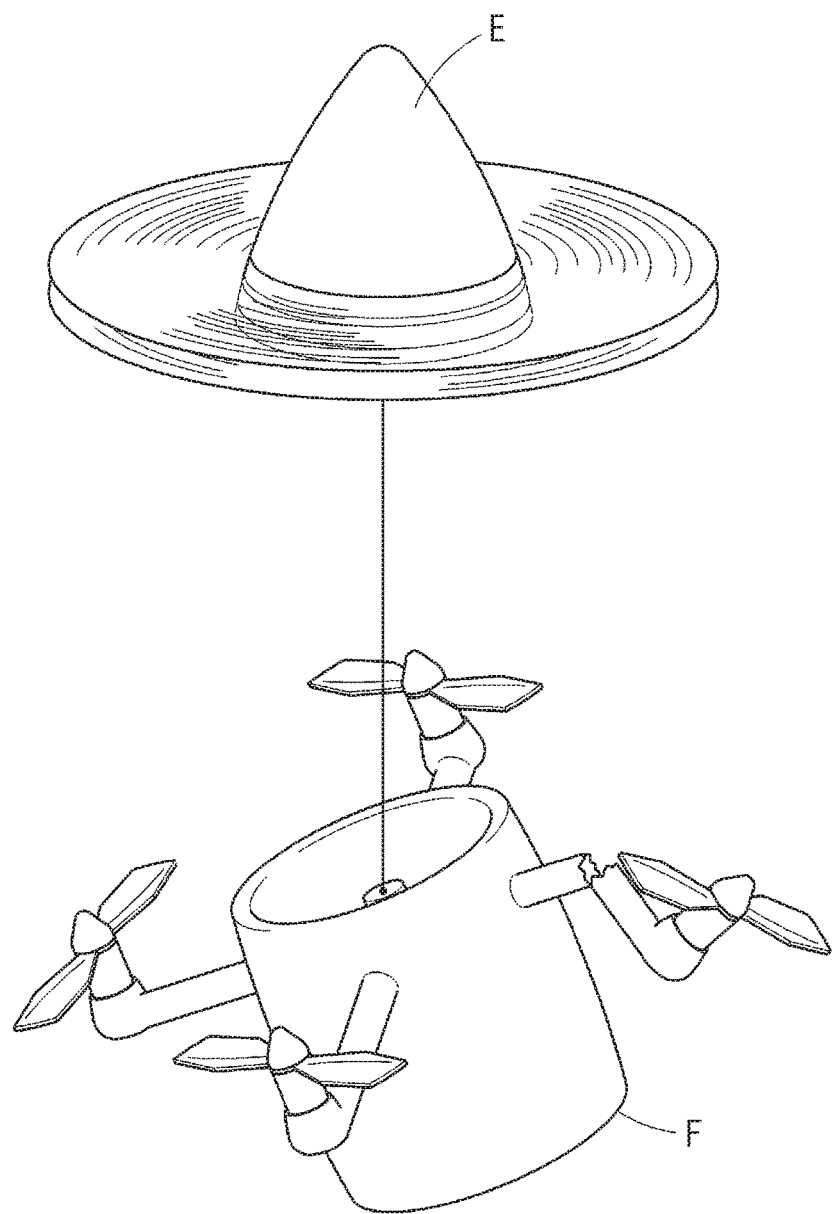
FIG. 4 is an explanatory diagram depicting a state that the main body is suspended from the emergency module upon actuation of a fall prevention device of the multicopter in FIG. 1.

FIG. 4 is an explanatory diagram depicting a state that the main body is suspended from the emergency module E upon actuation of the fall prevention device of the multicopter in FIG. 1. As depicted in FIG. 4, the emergency module E and the main body F are configured to be connected by suspension means such as a cable or wire after their separation and formed so that the main body F is placed in a state that it is suspended from the emergency module E after the emergency module E and the main body F are physically separated. For the suspension means, a cable or wire having strength enough to bear the weight of the main body F is used.

The suspension means is configured such that one end of the cable or wire is connected to a point vertically beneath the gravity center of the emergency module E when the main body has been suspended from the emergency module E. By thus configuring the suspension means, during a flight with the main body F hanging from the emergency module E, even when the main body F has become significantly imbalanced in weight because of collision or missing or damaged parts or the like, the emergency module E can be kept horizontal easily with its attitude not tilting. Therefore, even in a case where the airframe has become imbalanced in weight and tilted largely, the emergency rotors Pe1, Pe2 are kept horizontal and produce designed lift, and a safe emergency landing is enabled.

In addition, instead of the forced shutdown device Ds, it is possible to form a contrivance in which the power lines or signal lines of the main body F are broken to deactivate the operation of the rotors of the main body F when the main body F and the emergency module E have been separated; a configuration can be made to implement the same function as the forced shutdown device Ds mentioned above. In particular, a configuration may be made such that the power lines or signal lines are initially connected by engagement of connectors or the like and the connectors are disengaged by utilizing force by which the lines are pulled up and down respectively by gravity or the like when the main body F and the emergency module E have been separated, so that the power lines or signal lines are electrically broken.

Figure 5:
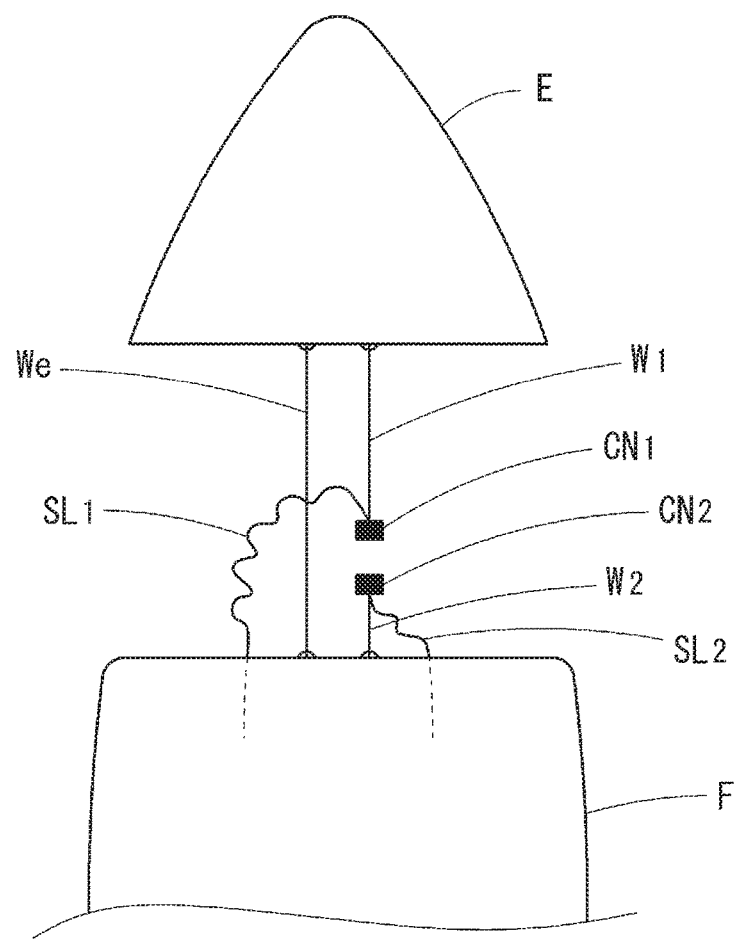
FIG. 5 is an explanatory diagram depicting a contrivance for disengaging connectors upon separation of the main body of the multicopter in FIG. 1.

FIG. 5 is an explanatory diagram depicting a contrivance for disengaging connectors upon separation of the main body of the multicopter in FIG. 1. As depicted in FIG. 5, between the main body F and the emergency module E, in addition to a hanging wire We, a wire in which a wire W1 and a wire W2 are connected by a connector CN1 and a connector CN2 is placed in parallel with the wire We. A total length of the wire W1 and the wire W2 after being connected is shorter than length of the wire We. A signal line SL1 is connected to the connector CN1 and a signal line SL2 is connected to the connector CN2. A configuration is made such that, with the connector CN1 and the connector CN2 being connected, the signal line SL1 and the signal line SL2 are electrically connected and the main body F operates normally through the signal lines.

When the main body F and the emergency module E separate, the main body F is placed in a state that it is suspended by the wire We from the emergency module E. Because the length of the wire W1 and the wire W2 is shorter than the wire We, the connector CN1 and the connector CN2 are pulled up and down respectively and disengaged by the weight or the like of the main body F. Disengagement of the connector CN1 and the connector CN2 breaks electrical connection between the signal line SL1 and the signal line SL2. When the signal line SL1 and the signal line SL2 are broken, the signal lines will no longer function, the function of the main body F is also shut down forcedly, and the operation of the rotors P1 to P4 or the like is also deactivated. Now, a configuration may be made using power lines instead of the signal lines mentioned above.

As depicted in FIG. 5, provision of a contrivance in which the signal lines or power lines of the multicopter are broken when the main body F and the emergency module E have been separated makes it possible to deactivate all functions including the rotors P1 to P4 of the main body F automatically. Therefore, even in a case where failure occurs in the control device C of the main body, the attitude measurement sensor S1, the abnormality detection sensor S2, or the forced shutdown device Ds among others, it can be prevented that the main body F continues to move abnormally or makes a motion which may damage the emergency module E.

The multicopter may be configured to drive and rotate the emergency rotors Pe1, Pe2 using the ordinary power source B during an ordinary flight. Then, when failure or abnormality of the main body F has been detected, the ordinary power source C may be switched to the emergency power source Ce to drive and rotate the emergency rotors Pe1, Pe2. Thereby, the emergency rotors can be assigned to produce apart of lift required and, therefore, an efficient flight is enabled.

Attitude control and movement of the multicopter are implemented by changing the rotating speed of each of a plurality of rotors. Hence, the motors of the rotors which are used for an ordinary flight have a rapid response speed and a characteristic of allowing for elaborate control of rotating speed. In contrast to this, the motors of the emergency rotors Pe1, Pe2 have a characteristic of producing stable lift. Because of such difference in characteristics, power efficiency of the rotors P1 to P4 which are used for an ordinary flight is poorer than that of the emergency rotors Pe1, Pe2. Making the emergency rotors Pe1, Pe2 rotate during ordinary operation improves power efficiency. Moreover, if lift produced by the emergency rotors Pe1, Pe2 is used for an ordinary flight, lighter and cheaper ones as the ordinary rotors P1 to P4 and the motors thereof can be used.

Now, as means for instantaneous switching between connections of a plurality of ordinary power sources and emergency power sources to the emergency rotors without affecting each other, a configuration such as a commonly used backup power supply can be used.

While an embodiment of the present invention has been described hereinbefore, the present invention is not limited to the foregoing embodiment and can be modified in various ways without departing from the gist of the present invention.

Although pieces of equipment for emergency use are assembled in an upper part to form a module, thus configuring the emergency module E in the embodiment in FIG. 1, a structure in which pieces of equipment for emergency use are not assembled in an upper part is also possible if the module E is not separated from the main body F.

Although the main body F is equipped with four rotors in the structure example in FIG. 1, the main body of a multicopter of the present invention can be equipped with an arbitrary number of rotors. Also, disposition of the rotors is exemplary and the main body can be equipped with the rotors in various layouts.

Although the emergency module E is equipped with two emergency rotors in the structure example in FIG. 1, that module of a multicopter of the present invention can be equipped with two or more, which is an arbitrary number of emergency rotors. Also, disposition of the emergency rotors is exemplary and that module can be equipped with the rotors in various layouts.

INDUSTRIAL APPLICABILITY

The present invention can be applied to a multicopter.

The invention claimed is:

1. An unmanned aerial vehicle equipped with a plurality of rotors, comprising:
   a power source for the plurality of rotors;
   emergency rotors which can be driven by an emergency power source which is different from the power source;
   an abnormality detection sensor for detecting abnormality of the unmanned aerial vehicle main body;
   an attitude sensor which is able to detect landing of the unmanned aerial vehicle main body and is actuated by the emergency power source; and
   an emergency control device,
   wherein the emergency control device deactivates operation of the plurality of rotors and drives the emergency rotors by the emergency power source when the abnormality detection sensor has detected abnormality of the unmanned aerial vehicle main body, and stops the rotation of the emergency rotors when the attitude sensor has detected landing of the unmanned aerial vehicle main body.

2. The unmanned aerial vehicle according to claim 1, wherein the vehicle comprises an altitude sensor which is able to measure altitude of the unmanned aerial vehicle main body and is actuated by the emergency power source; and
   the emergency control device adjusts the rotating speed of the emergency rotors to make the unmanned aerial vehicle main body descend at an optimum falling speed appropriate to an altitude measured by the altitude sensor.

3. The unmanned aerial vehicle according to claim 1, wherein the vehicle comprises a distance measurement sensor which is able to measure a distance from the unmanned aerial vehicle main body to the ground surface and is actuated by the emergency power source; and
   when the distance measurement sensor has detected that the unmanned aerial vehicle main body has come close to the ground surface at a predetermined distance to the ground surface, the emergency control device adjusts the rotating speed of the emergency rotors to cushion landing shock of the unmanned aerial vehicle main body.

4. The unmanned aerial vehicle according to claim 1, wherein the emergency rotors are driven by the power source during an ordinary flight; and
   upon detection of abnormality of the unmanned aerial vehicle main body, switching from the power source to the emergency power source is performed to drive the emergency rotors.

5. The unmanned aerial vehicle according to claim 1, wherein an emergency module in which the emergency power source and the emergency rotors are integrated is fixed to the unmanned aerial vehicle main body so as to be separable; and
   the vehicle comprises suspension means for placing the unmanned aerial vehicle main body in a state that the main body is suspended from the emergency module after separation of the emergency module.

6. The unmanned aerial vehicle according to claim 5, wherein the emergency module is fixed to a top side of the unmanned aerial vehicle main body; and
   the suspension means is connected to a point vertically beneath the gravity center of the emergency module.

7. The unmanned aerial vehicle according to claim 5, wherein separation of the emergency module from the unmanned aerial vehicle main body breaks power lines or signal lines of the unmanned aerial vehicle main body and deactivates operation of the plurality of rotors of the unmanned aerial vehicle main body.

8. The unmanned aerial vehicle according to claim 6, wherein separation of the emergency module from the unmanned aerial vehicle main body breaks power lines or signal lines of the unmanned aerial vehicle main body and deactivates operation of the plurality of rotors of the unmanned aerial vehicle main body.

* * * * *